(12) United States Patent
Robertson

(10) Patent No.: US 8,998,008 B1
(45) Date of Patent: Apr. 7, 2015

(54) CORNER SHELF ASSEMBLY

(71) Applicant: Bruce Mack Robertson, McLean, VA (US)

(72) Inventor: Bruce Mack Robertson, McLean, VA (US)

( * ) Notice: Subject to any disclaimer, the term of this patent is extended or adjusted under 35 U.S.C. 154(b) by 81 days.

(21) Appl. No.: 13/909,248

(22) Filed: Jun. 4, 2013

(51) Int. Cl.
| | | |
|---|---|---|
| *A47F 5/08* | (2006.01) | |
| *A47B 23/00* | (2006.01) | |
| *A47B 37/00* | (2006.01) | |
| *A47B 96/02* | (2006.01) | |
| *A47B 96/06* | (2006.01) | |
| *A47B 57/04* | (2006.01) | |
| *A47B 57/42* | (2006.01) | |
| *A47B 47/02* | (2006.01) | |
| *A47B 57/56* | (2006.01) | |
| *F16M 13/02* | (2006.01) | |

(52) U.S. Cl.
CPC ............ *A47B 96/022* (2013.01); *A47B 96/062* (2013.01); *A47B 96/028* (2013.01); *A47B 96/067* (2013.01); *A47B 96/027* (2013.01); *A47B 96/063* (2013.01); *A47F 5/08* (2013.01); *A47B 2220/0038* (2013.01); *A47B 57/045* (2013.01); *A47B 57/42* (2013.01); *A47B 47/022* (2013.01); *A47B 57/56* (2013.01); *F16M 13/025* (2013.01)

(58) Field of Classification Search
CPC ...... A47B 96/022; A47B 96/02; A47B 45/00; A47B 96/066; A47B 96/027; A47B 96/067; A47B 96/021; A47B 96/028; A47B 96/00; A47B 96/06; A47B 96/061; A47B 96/062; A47B 96/063; A47B 57/42; A47B 57/52; A47B 57/56; A47B 57/567; A47B 57/46; A47B 57/045; A47B 57/06; A47B 57/30; A47B 57/54; A47B 2220/0038; A47B 2220/0036; A47B 2220/0041; A47B 2005/003; A47B 47/00; A47B 47/021; A47B 47/022; A47B 96/068; A47B 96/024; A47B 5/00; A47B 5/04; A47C 15/002; A47G 7/041; A47K 3/282; A47F 5/0043; A47F 5/08; F16M 13/02; F16M 13/025; F16B 12/22; F16B 12/46; F16B 12/18

USPC .............. 211/90.01, 87.01, 119.009, 119.011, 211/150; 248/220.1, 235, 250; 108/42; 4/611

See application file for complete search history.

(56) References Cited

U.S. PATENT DOCUMENTS

| | | | | |
|---|---|---|---|---|
| 1,286,588 A | * | 12/1918 | Goodykoontz | .................. 108/28 |
| 1,325,143 A | * | 12/1919 | Conterio | ........................... 108/42 |
| 1,654,409 A | * | 12/1927 | Browne | .......................... 108/29 |
| 2,036,184 A | * | 4/1936 | Armstrong | ..................... 108/101 |
| 2,261,078 A | * | 10/1941 | Shockey | .......................... 108/42 |

(Continued)

*Primary Examiner* — Jennifer E Novosad
(74) *Attorney, Agent, or Firm* — Cheryl Husmann

(57) ABSTRACT

One embodiment of a corner shelf assembly having a shelf held securely in a horizontal position by a bracket or corner element, two support rails and two end caps. The shelf comprises a flat sheet with one corner clipped at its apex so that the shelf may be slid into a complementary slot in a bracket or corner element secured into a wall corner. The corner element is attached to two support rails held securely horizontal by the configuration of the corner piece. The support rails comprise a solid body with a narrow tongue protruding from it and running the length of the solid body. The tongues of the support rails are secured to walls having complementary openings and are further secured to the walls by fasteners. The shelf is rested upon the support rails and secured at its front by end caps that sandwich the shelf and the support rails, thus holding the shelf toward the corner and preventing it from tipping up or down. Other embodiments are described and shown.

18 Claims, 9 Drawing Sheets

(56) References Cited

U.S. PATENT DOCUMENTS

| | | | | |
|---|---|---|---|---|
| 2,389,349 | A | * | 11/1945 | Eastman .................. 108/42 |
| 2,465,635 | A | * | 3/1949 | Conterio .................. 108/42 |
| 3,008,585 | A | * | 11/1961 | McNeill .................. 108/42 |
| 3,906,872 | A | * | 9/1975 | Erickson .................. 108/92 |
| 4,708,310 | A | * | 11/1987 | Smith .................. 248/220.1 |
| 4,727,815 | A | * | 3/1988 | Miller .................. 108/42 |
| 4,760,800 | A | * | 8/1988 | Hanson .................. 108/190 |
| 4,886,236 | A | * | 12/1989 | Randall .................. 248/250 |
| D313,720 | S | * | 1/1991 | Sorenson et al. .......... D6/574 |
| 5,513,575 | A | * | 5/1996 | Slade .................. 108/42 |
| 5,983,805 | A | * | 11/1999 | Waluda .................. 108/42 |
| 6,059,128 | A | * | 5/2000 | Wang .................. 211/90.01 |
| 6,079,336 | A | * | 6/2000 | Lindstrom .................. 108/42 |
| 6,467,636 | B1 | * | 10/2002 | Schaefer .................. 211/90.01 |
| 6,520,704 | B1 | * | 2/2003 | Vidmar et al. .................. 403/188 |
| 6,591,762 | B1 | * | 7/2003 | Haghayegh .................. 108/42 |
| 7,255,236 | B1 | * | 8/2007 | Sauder et al. .............. 211/90.01 |
| 7,987,535 | B1 | * | 8/2011 | Tesch .................. 4/611 |
| 8,225,435 | B2 | * | 7/2012 | Kik et al. .................. 4/578.1 |
| 8,839,980 | B2 | * | 9/2014 | Baines .................. 220/481 |
| 2008/0224004 | A1 | * | 9/2008 | Gallien .................. 248/220.1 |
| 2010/0308186 | A1 | * | 12/2010 | Thompson .................. 248/205.3 |
| 2014/0197119 | A1 | * | 7/2014 | Stenhouse .................. 211/26 |

* cited by examiner

CORNER SHELF ASSEMBLY

BACKGROUND

1. Field

This invention relates to shelves in general and more particularly to types of shelves and shelf assemblies that are used in wall corners.

2. Prior Art

There are many types of shelves existing in the market consisting basically of a shelf connected to supports that may, or may not, be visible after installation. Some shelves are produced for simplicity and inexpensive manufacturing, some are produced for strength and stability, and some are produced to look good by hiding any support structures, but the combination of these qualities is elusive.

Traditional shelves consist of a flat plank of wood or plastic laid on top of a support structure. The support structures can be pegs, rails, brackets, braces, or the like. With this type of construction, the shelf is generally supported from the bottom, and the shelf is prone to move from side-to side, tip up or down, and slide away from the wall. Additionally, shelves constructed of wood or plastic are prone to bow, buckle, stretch or sag over time. Many methods to overcome these problems involve improved brackets, supports and shelf configurations. However, these improvements create additional problems such as increased cost to manufacture or complexity of installation, weakened integrity of the shelf, or unattractive supports.

U.S. Pat. No. 2,036,184 shows a corner shelf secured to its supports by inserting the shelf apex into a gap that is formed by installing two vertical supports spaced apart the width of the shelf. The shelf is also prevented from sliding forward by blocks installed into the walls in front of the shelf. This construction is problematic because it requires multiple support strips be installed to form the supporting gap and the patent specifically states the front blocks must allow the shelf to tip upward at its front.

U.S. Pat. No. 4,886,236 shows a corner shelf secured to a wall within a bracket running the length of the top and bottom of the shelf. This construction prevents tipping, but only so long as the brackets themselves do not pull away from either the walls or the wall corner. Further, this construction lacks a method to prevent the shelf from sliding forward from the wall and the top portion of the bracket is clearly visible along the top sides of the shelf. Similarly, U.S. Pat. No. 5,799,803 shows a cantilevered shelf and shelf bracket that supports a shelf at its top and bottom, but the bracket along the top sides of the shelf is clearly visible and this construction is specifically designed to allow the shelf to tip upward at its front.

U.S. Pat. No. 5,404,822 shows an example of a glass shelf supported by strong braces below it. The braces, however, are large, cumbersome, unattractive, and noticeably visible through the glass shelf. This shelf construction is problematic because it allows the shelf to move side-to-side, to tip up, and to move away from the wall.

U.S. Pat. Nos. 6,059,128 and 5,922,654 show shelves supported by brackets designed to give strength and stability to the shelf, but each construction is highly complex and involves multiple pieces underneath the base of the shelf. Not only are these constructions complex to manufacture and install, but they are also unsuitable for any type of glass or transparent shelf material.

There are numerous examples of shelf assemblies that hide all supporting structures to increase the attractiveness of the shelf. The problem each of these assemblies presents is that the shelf must either have some sort of tongue protruding from it to fit into a complementary wall groove or bracket, or the shelf must have some sort of recess, hole, groove or cavity that will receive complementary support structures. In most of these examples the integrity of the shelf material is compromised and in all cases the construction is unsuitable for any type of glass or transparent shelf material.

SUMMARY

In accordance with one embodiment, a simple, elegant and strong corner shelf assembly comprises a tempered glass corner shelf held securely in a horizontal position by a bracket or corner element, two support rails and two end caps. The tempered glass corner shelf comprises a flat sheet with one corner clipped at its apex so that the shelf may be slid into a complementary slot in a corner bracket or element. The corner element comprises a solid body having a horizontal slot which is secured into a wall corner with a bolt or screw. The corner element is attached to two support rails held securely horizontal by the configuration of the corner piece. The support rails comprise a solid body with a narrow tongue protruding from it and running the length of the solid body. The tongues of the support rails are inserted into complementary openings in walls forming a corner and are secured by an adhesive, grout or other suitable material. The support rails are further secured to the walls by bolts, screws or other fasteners inserted through holes in the support rails positioned so the fasteners may embed in studs or joists. The clipped apex of the corner shelf is slid into the corner element slot, the shelf is rested upon the support rails, and the shelf is secured at its front by end caps that sandwich the shelf and the support rails, thus holding the shelf toward the corner and preventing it from tipping up or down. When installed in a wall corner, this embodiment provides a very strong shelf assembly with a tempered glass shelf that will not tip up or down, will not slide away from the wall corner, will not shift side-to-side, and is not prone to bow, buckle, stretch or sag over time. This embodiment is simple, strong, stable and aesthetically pleasing.

DRAWINGS

REFERENCE NUMERALS

Figure 1:
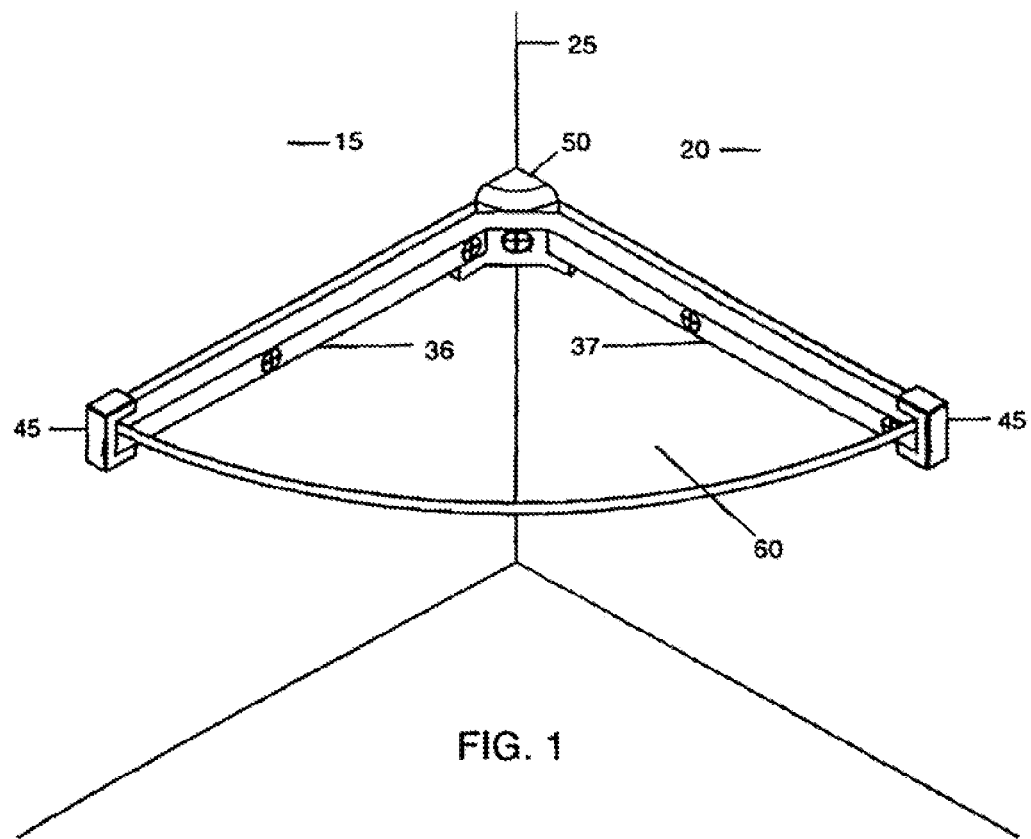
FIG. 1 shows a corner shelf assembly mounted to a wall corner in accordance with one embodiment.

- 15 Wall
- 20 Wall
- 21 Wall Opening
- 25 Wall Corner
- 30 Solid Body
- 31 Tongue
- 32 Hole
- 33 Hole
- 35 Hole
- 36 Rail
- 36' Rail
- 37 Rail
- 37' Rail
- 40 Front Face
- 41 Side
- 42 Side
- 43 Hole
- 44 Hole
- 45 End Cap
- 45' End Cap
- 48' End Cap
- 48 Center End Cap
- 50 Corner Element
- 50' Corner Element
- 50a Corner Back Side
- 50b Corner Back Side
- 50c Corner Apex
- 51 Horizontal Slot
- 52 Lip
- 53 Corner Front Side
- 54 Base
- 55 Horizontal Base
- 56 Hole
- 57 Hole
- 58 Front Face
- 58a Front Face Side
- 58b Front Face Side
- 59 Hole
- 60 Flat Shelf
- 61 Clipped Corner
- 62a Shelf Side
- 62b Shelf Side
- 64 Linear Segment
- 66 Shelf Front Side
- 80 Fastener
- 82 Fastener
- 83 Fastener
- 84 Fastener
- 90 Fence rail

DETAILED DESCRIPTION OF THE FIRST EMBODIMENT

FIG. 1—Overview

Referring now to the drawings, a corner bracket or element is generally referred to with numeral 50, a support rail positioned to the left of a corner element is generally referred to with numeral 36, and a support rail positioned to the right of a corner element is generally referred to with numeral 37.

FIG. 1 is a plan view of a corner shelf assembly comprised of a corner element 50, two rails 36, 37, a flat shelf 60, and two end caps 45. Corner element 50 is secured to wall corner 25. Rails 36, 37 are secured to element 50 and to walls 15, 20. Flat shelf 60 is held in place by corner element 50 and rests on rails 36, 37. End caps 45 sandwich flat shelf 60 and the ends of rails 36, 37 and are secured to rails 36, 37.

Figure 3A:
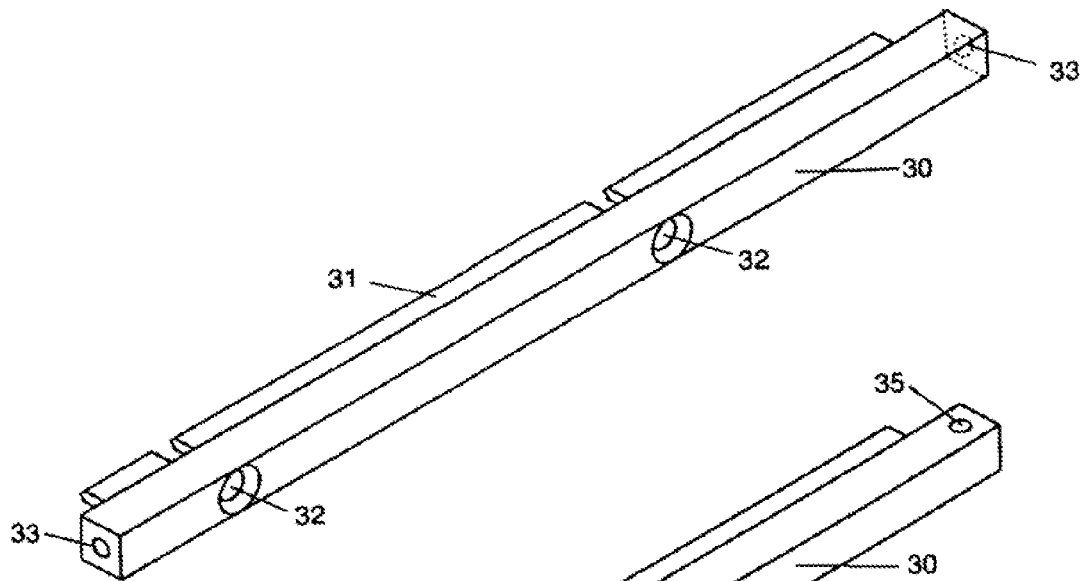
FIGS. 3A and 3B show views of support rails having various combinations of through holes in accordance with other embodiments.

Rails 36, 37 (FIG. 3B) are each comprised of a solid body 30, a tongue 31, vertically oriented hole 35 located at each end of solid body 30, and a plurality of holes 32 running through solid body 30 and tongue 31. Solid body 30 is generally rectangular in shape and its length corresponds generally to the length of side 62a, 62b supported by it. Tongue 31 protrudes substantially perpendicularly from solid body 30 and the length of tongue 31 corresponds generally to the length of solid body 30. FIG. 3A is a plan view of alternative support rails 36', 37' wherein horizontally oriented holes 33 are located at each terminal end of solid body 30 alternative to holes 35 of FIG. 3B. The support rail 36', 37' of FIG. 3A and its components is similar in all other respects to the support rail 36, 37 of FIG. 3B.

Corner element 50 (FIG. 5B and FIG. 5D) is comprised of a solid body having two back sides 50a, 50b joining at an apex 50c, a slot 51 to receive clipped corner 61 of flat shelf 60, a lip 52 and base 54 to hold flat shelf 60 in a horizontal position, two front sides 53 each perpendicular to a back side 50a, 50b, respectively, two horizontal bases 55 each protruding substantially perpendicularly from front sides 53, respectively, a front face 58 connecting front sides 53, a horizontally oriented hole 57 countersunk in the center of front face 58 extending through apex 50c, and vertically oriented holes 56 in horizontal bases 55.

Flat shelf 60 (FIGS. 6A to 6D) is comprised of three sides, 62a, 62b, 66, two linear segments 64, and a clipped corner 61.

Figure 4A:
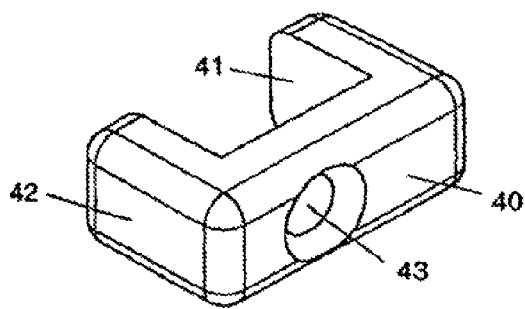
FIG. 4A to 4D show views of end caps having various combinations of through holes in accordance with other embodiments.
Figure 4B:
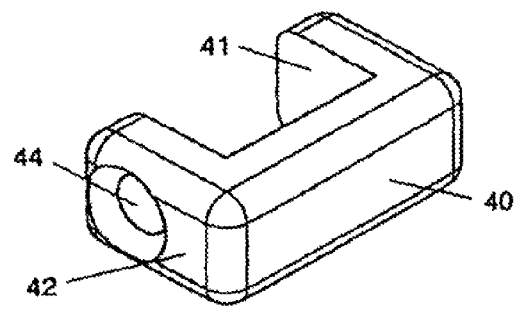

End cap 45 (FIG. 4B) is comprised of a front face 40, sides 41, 42 protruding substantially perpendicularly from front face 40, and a hole 44 located in side 42. The distance between the interior surfaces of sides 41, 42 corresponds generally to the combined thickness of flat shelf 60 and solid body 30. FIG. 4A is a plan view of an alternative embodiment end cap 45' having hole 43 in front face 40 alternative to hole 44 of FIG. 4B. The end cap 45' of FIG. 4A and its components is similar in all other respects to end cap 45 of FIG. 4B.

The angle at apex 50c of corner element 50 (FIG. 5B and FIG. 5D) and the angle formed where sides 62a, 62b of flat shelf 60 meet will be substantially right angles corresponding to the substantially right angle formed by walls 15 and 20 of corner 25. However, these angles may vary; for example, the angle at apex 50c and the angle formed where sides 62a, 62b of flat shelf 60 meet may correspond generally to the angle formed by walls 15 and 20 of corner 25 whereby such angle is either acute or obtuse and the angle of apex 50c and the angle formed where sides 62a, 62b of flat shelf 60 meet will be correspondingly acute or obtuse.

Corner element 50, support rails 36, 37, and end caps 45 are each made from a solid casting or precision machined from a solid substrate. The substrate comprises a strong material suitable for solid casting or precision machining, such as chrome, copper, nickel, bronze, stainless steel, acrylics, anodized aluminum, plastics, or the like. The substrate may also be a more exotic material such as titanium, silver, gold, platinum, or the like. Flat shelf 60 is preferably made of tempered glass but may be any other material suitable to provide stability and support, relative to the dimensions of the corner shelf assembly as a whole, without bending, buckling, bowing or sagging over time. Holes 33 and 35 are preferably threaded. Fasteners 83 and 84 are preferably machine screws, but other fasteners may be used such as nails, screws, pins, bolts or the like. Holes 43, 44, 56, 57 and 59 (FIGS. 5A and 5C discussed supra) are preferably unthreaded.

Figure 5A:
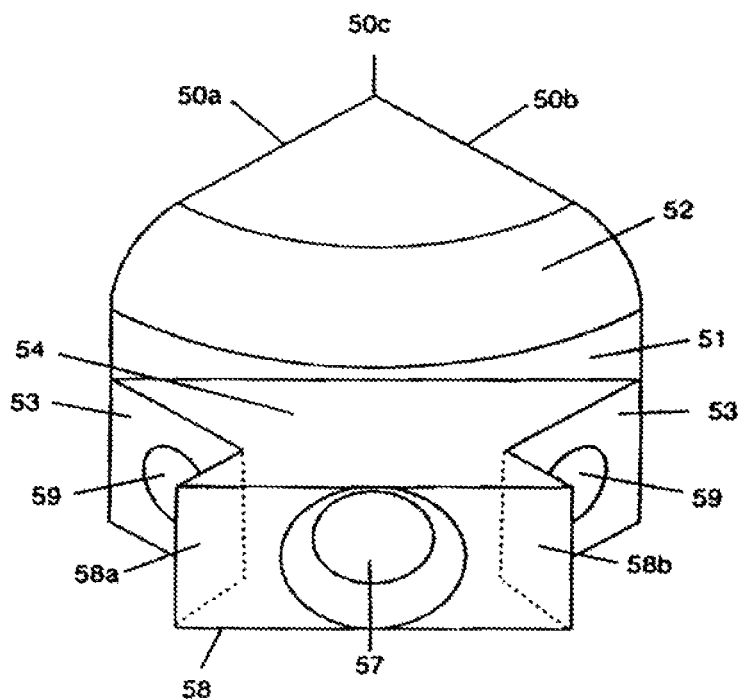
FIG. 5A to 5D show views of corner supports having various combinations of support bases, through holes and recesses in accordance with other embodiments.
Figure 5C:
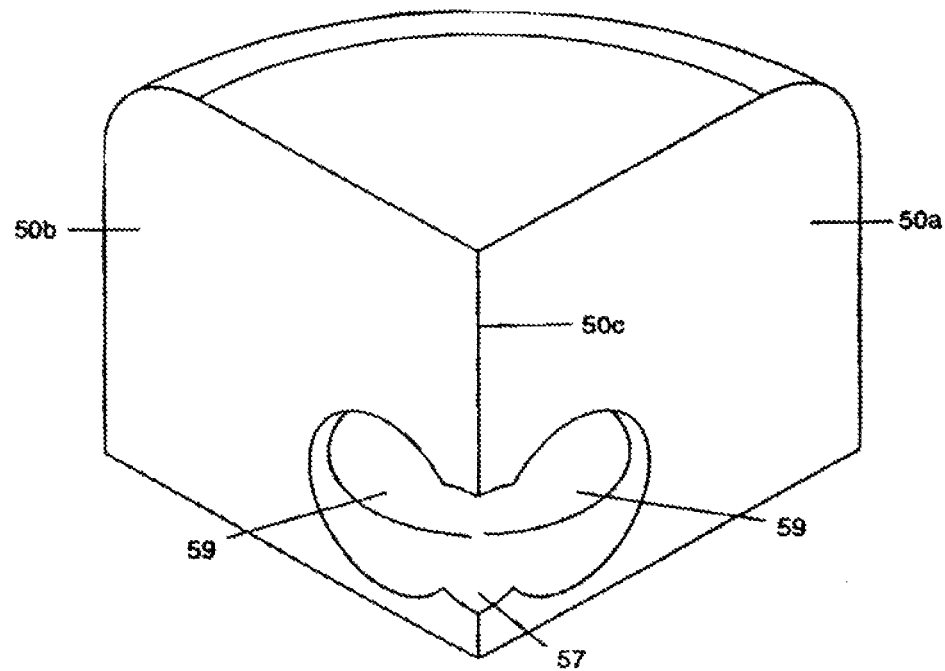
Figure 5B:
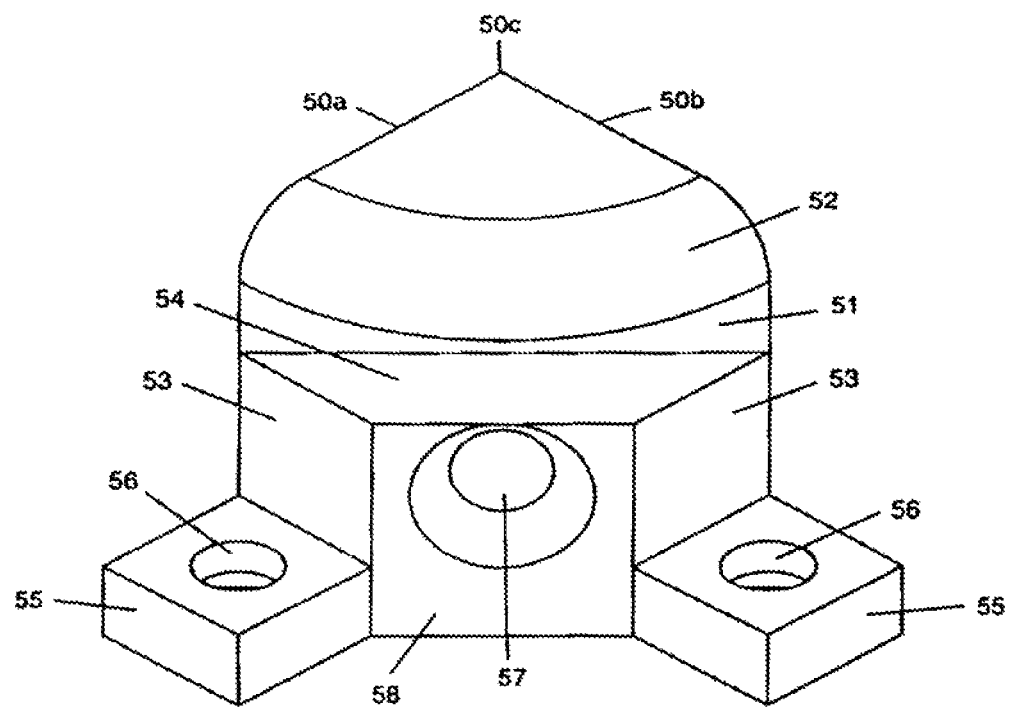
Figure 5D:
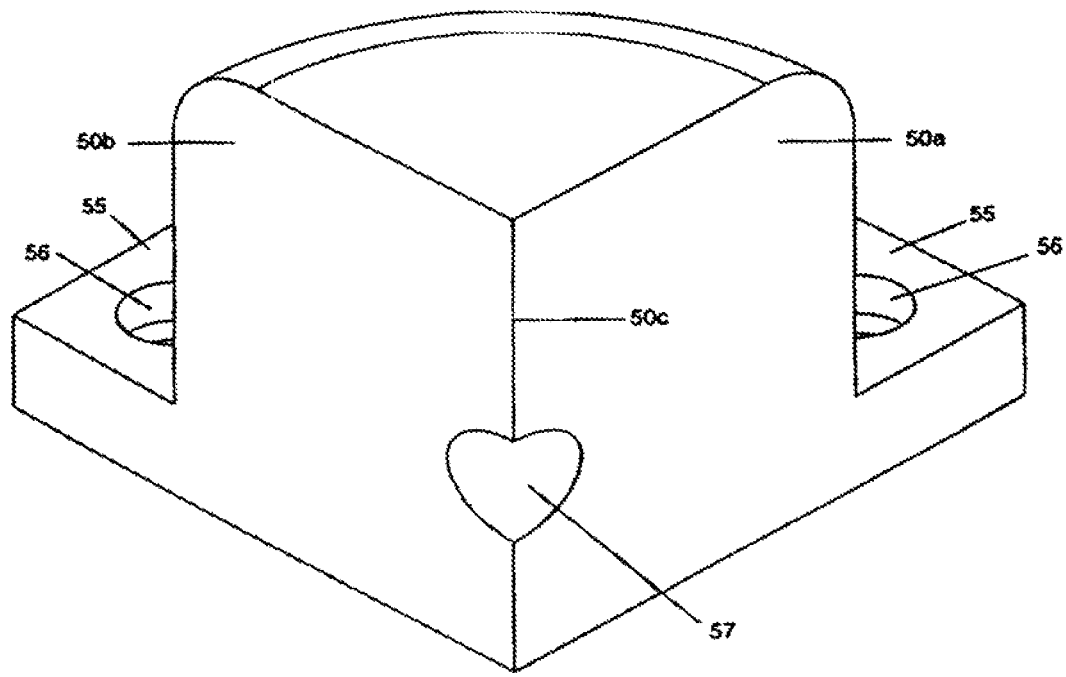
Figure 6A:
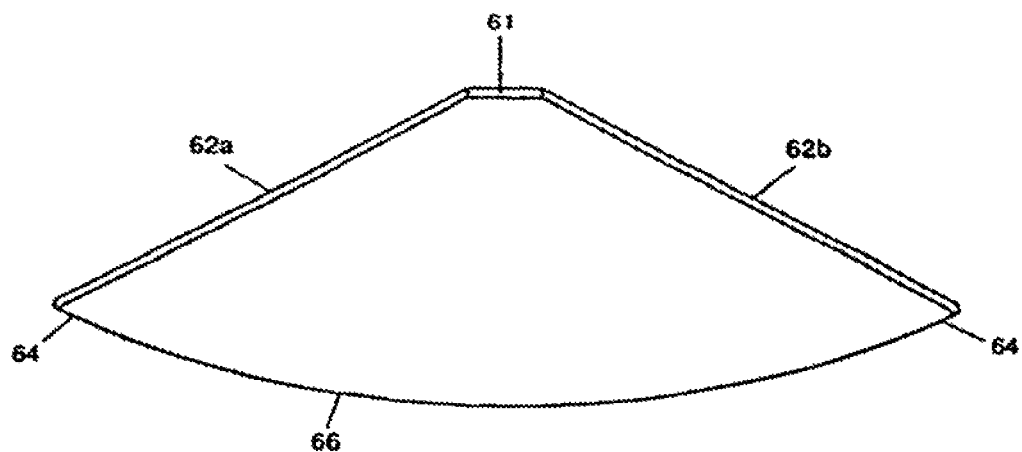
FIG. 6A to 6D show views of shelf members having various combinations of shapes in accordance with other embodiments.
Figure 6B:
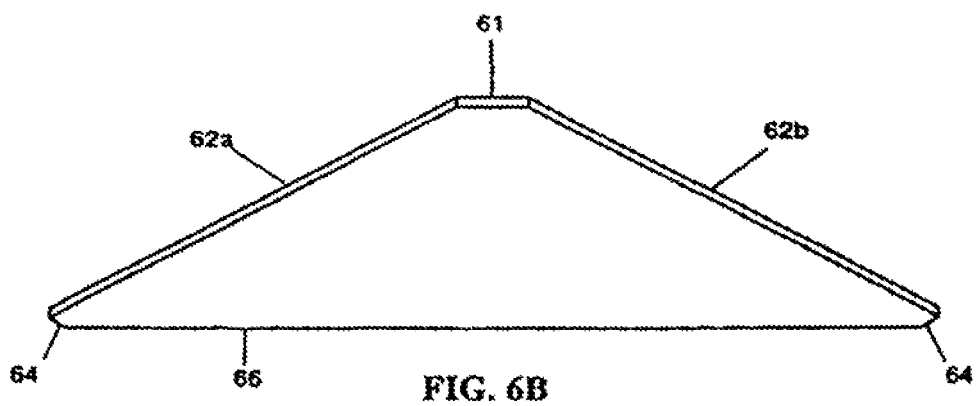
Figure 6C:
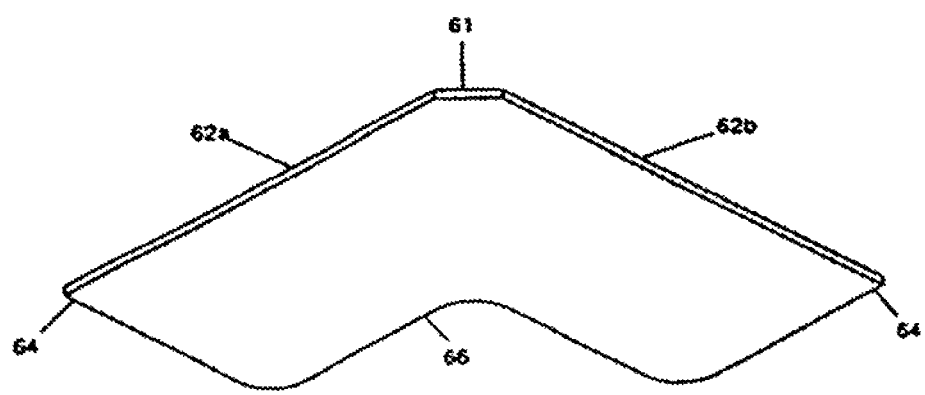
Figure 6D:
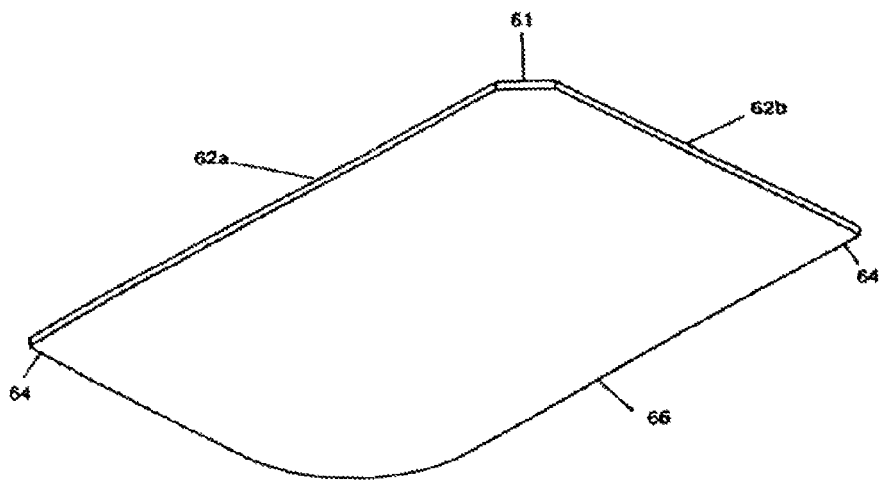

Corner Element—FIGS. 5B and 5D

FIG. 5B illustrates a front view of corner element 50. The configuration of sides 50a, 50b, sides 53, bases 55, and holes 56 enables a support rail 36, 37 to be fastened securely to corner element 50 and held firmly in a horizontal position. The angle formed by sides 53 joining back sides 50, 50b, respectively, will be a substantially right angle, but other angles may be used as described infra. The width of side 53 corresponds generally to the width of support rail solid body 30. The width of base 55 corresponds generally to the width of side 53 and support rail solid body 30. The depth of base 55 typically corresponds to its width, although other depths may be used. The height of base 55 is an approximate correlation to the strength of the material of corner element 50. For example, the height of base 55 may be approximately half the width of base 55, the same width as base 55 or twice the width of base 55, although other widths may be used. In one embodiment wherein the length of sides 62a, 62b of flat shelf 60 are five and one-half inches, corner element 50 is made of aluminum, and the height and width of support rail solid bodies 30 and sides 53, are one-quarter inch, and the width and depth of base 55 is are one-quarter inch, a suitable height of bases 55 is one-quarter inch. In another embodiment wherein the length of sides 62a, 62b of flat shelf 60 are five and one-half inches, corner element 50 is made of stainless steel, and the height and width of support rail solid bodies 30 and sides 53, are one-quarter inch, and the width and depth of base 55 is are one-quarter inch, a suitable height of bases 55 is one-eighth inch. In all embodiments, the dimensions of the components may be scaled accordingly.

The configuration of slot 51, top lip 52, and base 54 enables flat shelf 60 to be held firmly in a horizontal position when clipped corner 61 is inserted into slot 51. The width of horizontal slot 51 corresponds generally to the width of clipped corner 61 as described supra. The height of horizontal recess 51 corresponds generally to the thickness of shelf member 60. The depth of horizontal slot 51 is generally sufficient to cause top lip 52 to extend over flat shelf 60 and to cause base 54 to support the underside of flat shelf 60 in such a manner that flat shelf 60 is held securely in a horizontal position. In the embodiments described in the preceding paragraph, one-quarter inch is a suitable depth of horizontal slot 51.

FIG. 5D illustrates a back view of corner element 50. Sides 50a, 50b extend substantially perpendicular with respect to each other and conform to walls 15, 20 of corner 25, although other angles may be used as described infra. Hole 57 is countersunk in the center of front face 58 and extends through apex 50c so that corner fastener 82 can be inserted through hole 57 to fasten the corner element securely in wall corner 25. Hole 57 is sufficiently large to accommodate corner fastener 82, which can be a nail, screw, pin, bolt or the like of sufficient length to securely embed in wall corner 25. In one embodiment corner fastener 82 is a two-inch, number 6 sheet rock or sheet metal screw, which is an appropriate length to securely embed in framing members (not shown) behind wall corner 25, which may include wood or metal framing members such as studs, joists or the like.

Figure 3B:
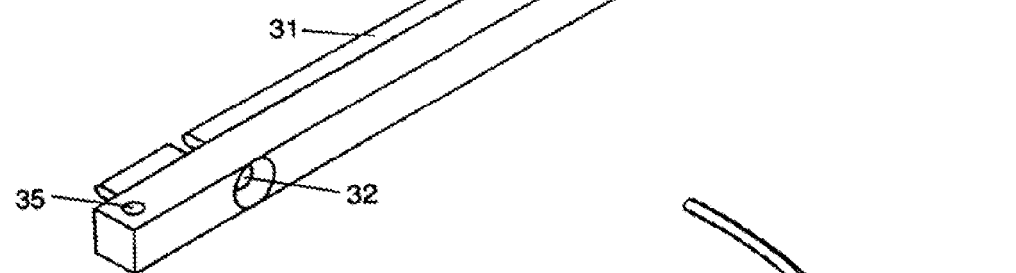

Support Rails—FIG. 3B

FIG. 3B illustrates one embodiment of support rail 36, 37. Solid body 30 is generally rectangular in shape, although it may take other shapes. In one embodiment, solid body 30 is five inches long, one-quarter inch high, and one-quarter inch wide. However, solid body 30 may be any combination of width, height and length suitable to support flat shelf 60.

The perpendicular configuration of tongue 31 protruding from and spanning the length of solid body 30 enables support rails 36, 37 to be securely fastened to walls 15, 20. The width of tongue 31 is sufficient to fully insert tongue 31 into wall openings 21 so that solid body 30 is held firmly against walls 15, 20 but without tongue 31 breaching the total thickness of walls 15, 20 and without significantly compromising the strength of walls 15, 20. In embodiments wherein the corner shelf assembly is installed in one-half inch drywall, sheetrock, green board, or the like, one-quarter inch is a suitable width for tongue 31, although other widths may be used.

Holes 32 are spaced approximately two and one-half inches apart and offset from one end of solid body 30 so that rotating support rail 36, 37 by 180° end-over-end will shift the lateral position of holes 32 by the width of a standard wall stud or joist. In one embodiment, this spacing may be achieved by positioning one hole approximately five-eighth inch from the center of solid body 30 and positioning additional holes at increments of two and one-half inches and no holes placed within one inch of the ends of solid body 30, although other spacing may be suitable. In one embodiment wherein support rails 36, 37 are approximately five and one-half inches long, two holes 32 are suitable; however, any number of holes 32 may be used to provide additional support for larger shelf assemblies.

Flat Shelf Element—FIGS. 6A to 6D

Flat shelf 60 is comprised of three sides, 62a, 62b, 66, two linear segments 64, and a clipped corner 61. Sides 62a, 62b extend substantially perpendicular with respect to each other and conform to walls 15, 20 of corner 25. The apex of sides 62a, 62b has a 45 degree corner clipped off so that a clipped corner 61 is formed. In one embodiment wherein sides 62a, 62b are at a right angle with respect to each other, the width of clipped corner 61 is the hypotenuse of the triangle formed when the apex of sides 62a, 62b is clipped at said 45 degrees. In other embodiments wherein sides 62a, 62b are obtuse or acute with respect to each other, the width of clipped corner 61 is the remaining side of the triangle formed when the apex of sides 62a, 62b is clipped at said 45 degrees. Front side 66 may take a variety of forms including a straight line (shown in FIG. 6B), a curved line (shown in FIG. 6A), a generally rectangular shape (shown in FIG. 6D), and free form (shown in FIG. 6C). The only requirements for front side 66 are that the ends of front side 66 join sides 62a, 62b, respectively, and that it have a linear segment 64 extending from sides 62a, 62b, respectively, at a substantially right angle. The length of linear segment 64 corresponds generally to the width of the support rail 36, 37 and the width of end cap front 40.

In one embodiment, flat shelf 60 is a sheet of one-quarter inch tempered glass; however, the tempered glass can be any other thickness that can provide stability and support relative to the dimensions of the corner shelf assembly as a whole, such as three-sixteenth inch, half inch, or the like.

Figure 7A:
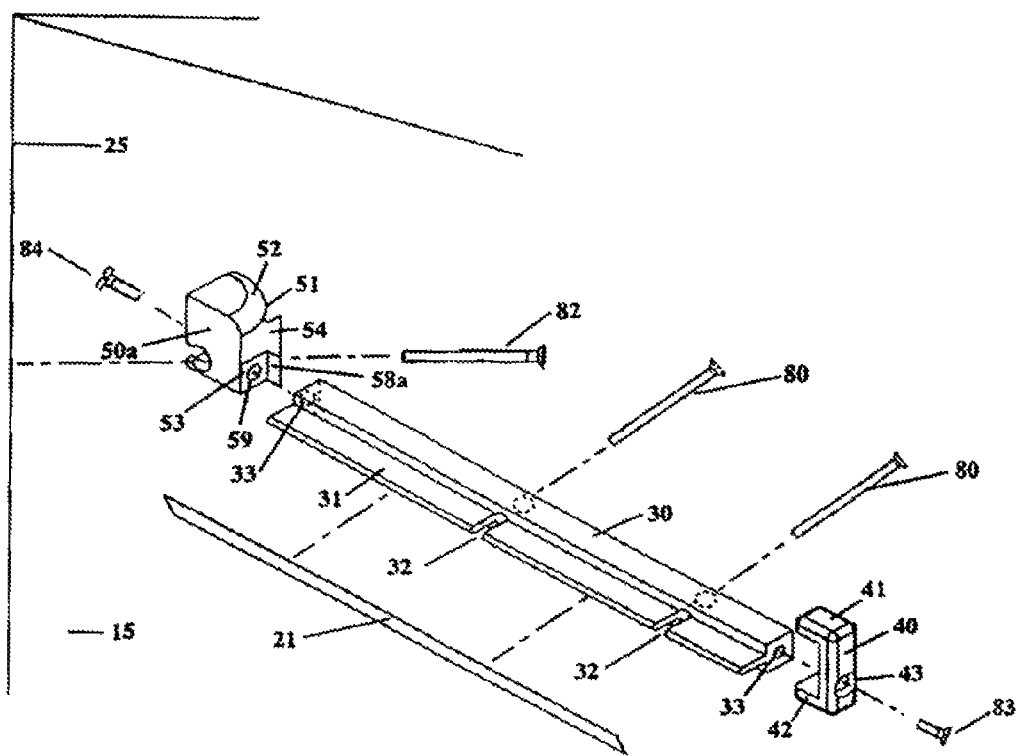
FIGS. 7A and 7B show exploded views of one side of a corner shelf assembly assembled in various combinations in accordance with other embodiments.
Figure 7B:
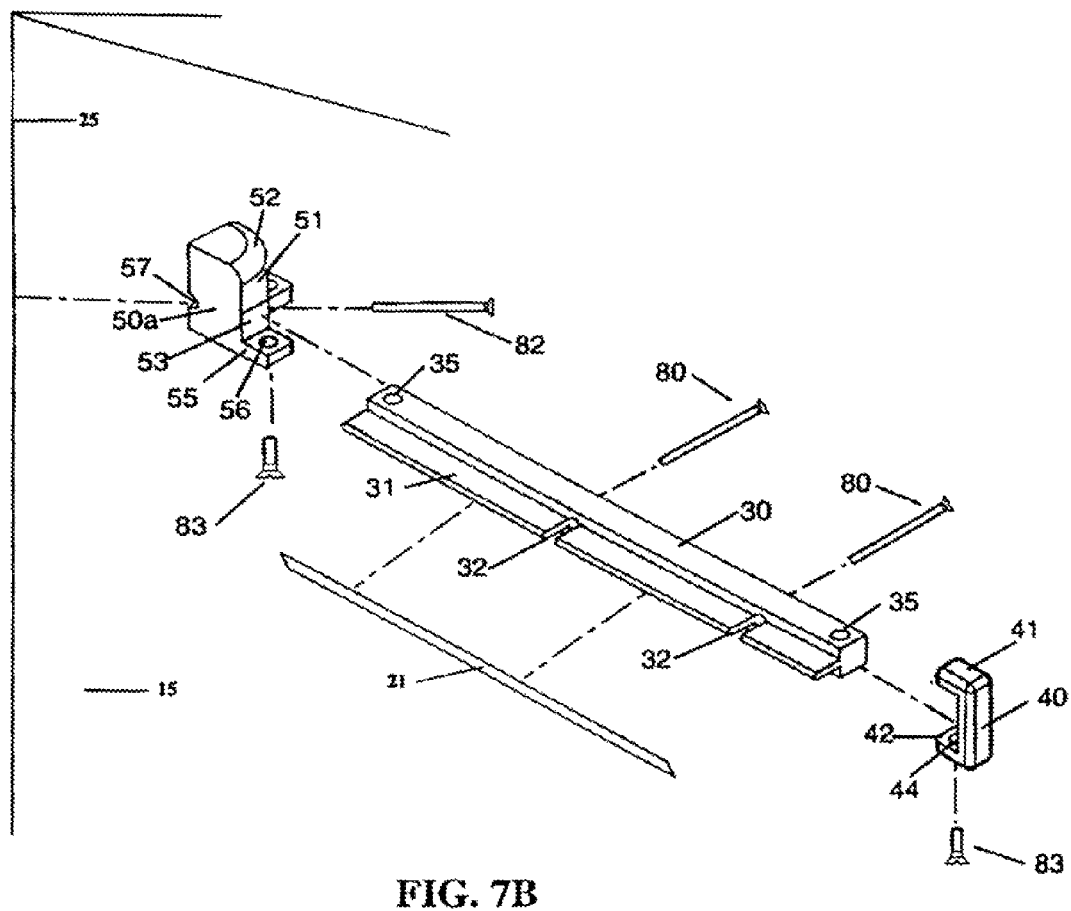

First Embodiment Assembly—FIGS. 1 and 7B

FIG. 7B shows an exploded view of assembled corner element 50, support rail 36 and end cap 45. Corner element 50 is oriented so that side 50a is against wall 15 and apex 50c is against wall corner 25. Fastener 82 is inserted through hole 57 and securely embedded in wall corner 25 so that corner element 50 is held securely to wall corner 25.

Support rail 36 is oriented so that tongue 31 is against wall 15, holes 32 generally align with a wall stud or joist, and one terminal end of solid body 30 is positioned perpendicularly to side 53. Tongue 31 is inserted into wall opening 21. Solid body 30 is then secured to base 55 by inserting fastener 84 through holes 35, 56. Wall opening 21 generally corresponds to the dimensions of tongue 31.

Support rail 36 is secured to wall 15 by inserting fasteners 80 through holes 32 in solid body 30. Fastener 80 can be a nail, screw, pin, bolt or the like of an appropriate size to fit through wall opening 21 and an appropriate length to pass through the combined width of body 30, tongue 31, and wall 15. In one embodiment, walls 15, 20 are formed of ceramic tiles, opening 21 is part of a grout line, and fasteners 80 are narrow enough to fit in grout lines without touching the surrounding ceramic tiles. In another embodiment wherein the corner shelf assembly is generally larger in size, fasteners 80 are of sufficient length to pass through the combined width of body 30, tongue 31, and walls 15, 20 and securely embed in framing members (not shown) behind walls 15, 20, which may include wood or metal framing members such as studs, joists or the like. Support rail 36 is further secured to wall 15 by applying adhesive materials to tongue 31 and wall opening 21. The adhesive may be any readily available adhesive such as glues, anaerobic adhesives, single- or two-part epoxies, acrylics, grout, and the like.

Assembly of support rail 37 (not shown) is achieved by orienting it so that tongue 31 is against wall 20, holes 32 generally align with a wall stud or joist and one terminal end of solid body 30 is positioned perpendicularly to side 53. Securing support rail 37 to corner element 50 and wall 20 is similar in all other respects to securing support rail 36 to corner element 50 and wall 15.

Flat shelf 60 is secured to corner element 50 by placing sides 62a, 62b on top of solid bodies 30 and then sliding clipped corner 61 into horizontal slot 51. End caps 45 are then oriented so that front faces 40 are held firmly against linear segments 64 and the remaining terminal ends of solid bodies 30. Sides 41 are placed on top of flat shelf 60 and sides 42 are placed underneath solid bodies 30. Fasteners 83 are then inserted through holes 35, 44 so that end caps 45 further secure flat shelf 60 firmly in corner 25.

Alternative Embodiment

Recessed Corner Element Sides—FIGS. 3A, 5A, 5C and 7A

FIG. 5A shows a front view of one aspect of an alternative corner element 50'. Instead of two horizontal protruding bases, sides 53 are recessed from front face 58. Holes 59 are centered and perpendicular through sides 53 and countersunk from the back (FIG. 5C) by at least three-eighths of an inch. The angle formed by sides 53 joining front face sides 58a, 58b, respectively, will be a substantially right angle. The width of sides 58a, 58b may correspond generally to one-half the width of sides 53, but other widths may be used. The angle formed by sides 58a, 58b, joining front face 58 will be substantially forty-five degrees. Corner element 50' and its components is similar in all other respects to corner element 50 of FIG. 5B.

FIG. 7A shows an exploded plan view of assembled corner element 50', support rail 36' and end cap 45'. Corner element 50' is oriented so that side 50a is against wall 15 and apex 50c is against wall corner 25. Support rail 36' is oriented so that tongue 31 is toward wall 15, holes 32 generally align with a wall stud or joist and one terminal end of solid body 30 is positioned perpendicularly to side 53 and parallel to side 58a. Support rail 36' is secured to corner element 50 by inserting fastener 84 from the back of corner element 50' through holes 59, 33. When fastener 84 is securely in place, the head of fastener 84 should be no more than one-eighth inch from the terminal end of solid body 30 to permit fastener 82 to pass through hole 57 unimpeded by fastener 84.

Assembly of support rail 37' (not shown) is achieved by orienting it so that tongue 31 is against wall 20, holes 32 generally align with a wall stud or joist, and one terminal end of solid body 30 is positioned perpendicularly to side 53 and parallel to side 58b. Assembly of support rail 3T is similar in all other respects to the assembly of support rail 36'.

Corner element 50' and support rails 36', 37' of FIG. 7A are secured to wall corner 25, and walls 15, 20, respectively in a fashion similar in all other respect to corner element 50 and support rails 36, 37 of FIG. 7B.

Flat shelf 60 is secured to corner element 50' by placing sides 62a, 62b on top of solid bodies 30 and then sliding clipped corner 61 into horizontal slot 51. End caps 45' are then oriented so that front faces 40 are held firmly against linear segments 64 and the remaining terminal ends of solid bodies 30. Sides 41 are placed on top of flat shelf 60 and sides 42 are placed underneath solid bodies 30. Fasteners 83 are then inserted through holes 33, 43 so that end caps 45' further secure flat shelf 60 firmly in corner 25.

Alternative Embodiment

End Caps and Fence—FIG. 4C, FIG. 4D, FIG. 8 and FIG. 9

Figure 9:
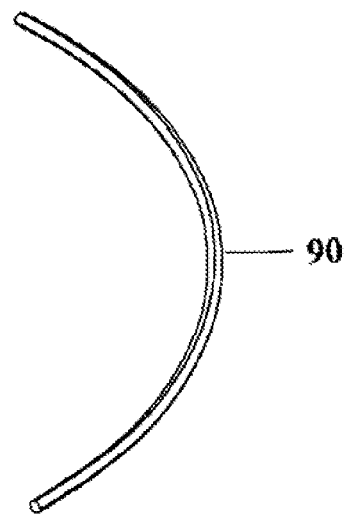
FIG. 9 is a plan view of a fence rail.
Figure 4C:
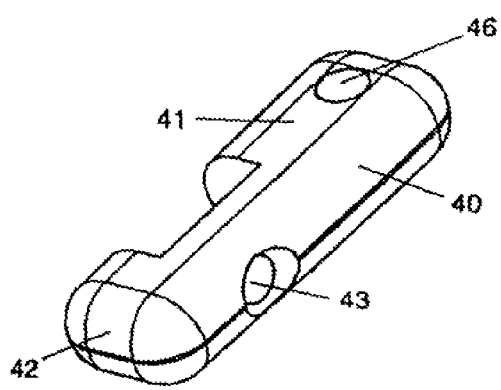

FIG. 4C is a plan view of an alternative embodiment end cap 48' having hole 46 horizontally oriented through the side of side 41. The thickness of side 41 corresponds to the desired height of support rail 90 (FIG. 9). The end cap 48' of FIG. 4C and its components is similar in all other respects to end cap 45' of FIG. 4A.

Figure 4D:
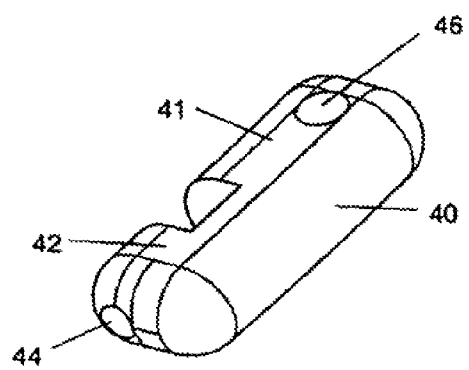

FIG. 4D is a plan view of an alternative embodiment center end cap 48 having hole 46 horizontally oriented through the side of side 41. The thickness of side 41 corresponds to the desired height of a fence rail 90. The distance between the interior surfaces of sides 41, 42 corresponds generally to the thickness of flat shelf 60. Hole 44 is preferably threaded. The end cap 48 of FIG. 4D and its components is similar in all other respects to end cap 45 of FIG. 4B.

Figure 8:
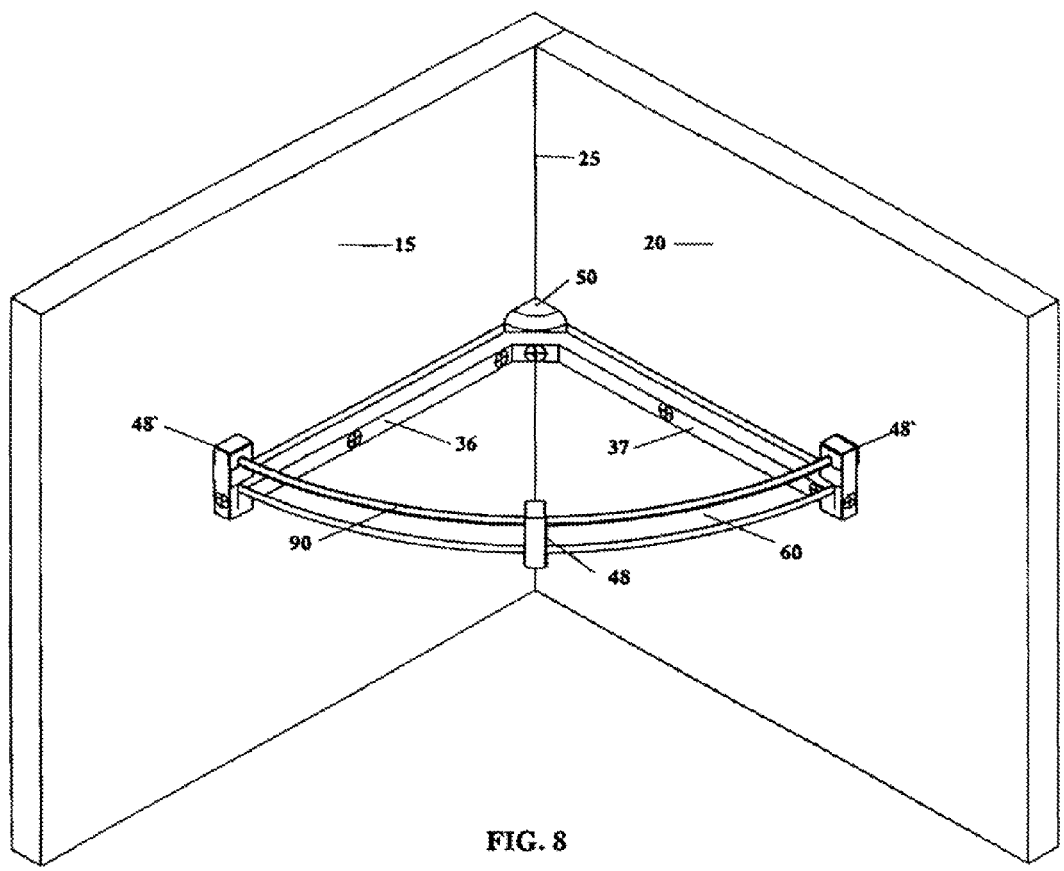
FIG. 8 shows a corner shelf assembly having a fence rail and such corner shelf assembly is mounted to a wall corner in accordance with another embodiment.

FIG. 8 is a plan view of a corner shelf assembly comprised of a corner element 50', two rails 36', 37', a flat shelf 60, two end caps 48', center end cap 48, and a fence rail 90. Fence rail 90 is made in the same manner and from the same materials as the corner elements, support rails and end caps. The shape of fence rail 90 generally corresponds to shelf front side 66 and its circumference generally corresponds to holes 46, although fence rail 90 and corresponding holes 46 may be other shapes. Fence rail 90 is fastened to the end caps by passing it through holes 46 in end caps 48' and center end cap 48. Center end cap 48 is secured to shelf front side 66 by passing a fastener (not shown) through hole 44. In embodiments wherein flat shelf 60 is tempered glass, such a fastener may be a soft tipped set screw, but other fasteners may be used.

Alternative Embodiment

Figure 2:
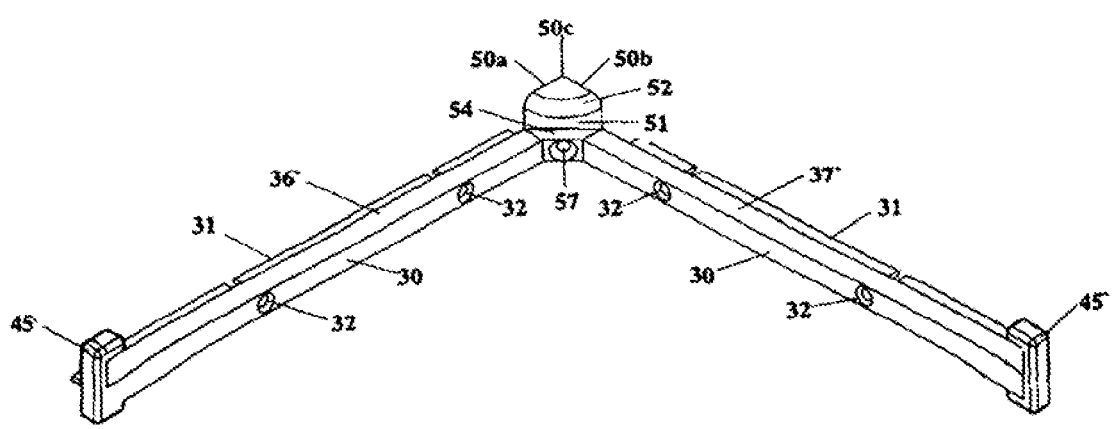
FIG. 2 is a plan view of a corner shelf assembly wherein a corner support, two support rails and two end caps are shown in accordance with another embodiment.

Single Unit Corner Element and Support Rails—FIG. 2

FIG. 2 illustrates an alternative embodiment of a corner shelf assembly, wherein the corner element, support rails and end caps are a single unit made from a solid casting or precision machined. In this alternative embodiment, the single unit is comprised of a corner element with two back sides 50a, 50b joining at an apex 50c, a slot 51, a lip 52, a base 54, a hole 57, two support rails having a plurality of holes 32 and protruding substantially perpendicularly from sides 50a, 50b, respectively, and two end caps. In this alternative embodiment, because the corner element, support rails, and end caps are a single unit, the various fastening means connecting these elements, such as holes 43, 44 in end caps 45, 45', bases 55 in corner element 50, holes 56, 59 in corner element 50, 50', holes 33, 35 in support rails 36, 36', 37, 37', and fasteners 83, 84 are absent. In this alternative embodiment, flat shelf member 60 is slid onto the support rails, between the top and bottom of the end caps, and into horizontal slot 51 prior to securing the shelf assembly to walls 15, 20 and wall corner 25.

CONCLUSIONS, RAMIFICATIONS, SCOPE

An improved corner shelf assembly is provided herein with minimal supporting hardware that holds a shelf firmly in a wall corner in such a way that the shelf will not tip up or down or slide away from the wall corner, thus allowing the use of strong, yet elegant materials for the shelf, such as tempered glass, that will not bend, buckle, bow or sag over time.

While the above description contains many specificities, these should not be construed as limitations on the scope, but as exemplifications of some present embodiments. Many other ramifications and variations are possible within the teachings of the invention. For example, the materials and sizes can be changed, the dimensions of the support rails can be varied, as can the shapes of the components. Many of the parts can be made of alternative materials including reinforced plastics, wood, and metals of various kinds. All components can be made in one or more colors for decorative effects. The support rails can be longer or shorter, as required by the length of the sides of the shelf. Tempered glass shelves can be thicker or thinner and the dimensions of the corner, rails and end caps can be increased or decreased accordingly. Instead of linear segments on the front of the shelf, curved segments may be used and the shape of the end cap can be modified to correspond to the curved segment. The corner shelf assembly can be installed in walls of a variety of materials such as ceramic tiles, drywall, wallboard, plasterboard, gypsum board, and plaster applied over a lath substrate. The corner shelf assembly may be installed by first creating an opening in an existing wall or it may be installed during construction of a wall.

Thus the scope should be determined by the appended claims and their legal equivalents, rather than the examples and particulars given.

The invention claimed is:

1. A corner shelf assembly comprising a shelf secured to a corner element attached to first and second support rails, and first and second end caps fastened to said first and second support rails, wherein
   (A) said shelf is comprised of first and second sides conforming to first and second walls of a wall corner, respectively, a clipped corner at the apex of said first and second sides, and a third side;
   (B) said corner element is comprised of a solid body having first and second sides conforming to aid first and second walls of a wall corner, respectively, a horizontal slot to receive the clipped corner of said shelf, a lip and a base, collectively to hold said shelf in a horizontal position, third and fourth sides joining said first and second sides, respectively, at substantially right angles, and a fifth side joining said third and fourth sides;
   (C) said first and second support rails are comprised of a solid body having a tongue protruding perpendicularly from said solid body and running the length of said solid body, and a plurality of horizontally placed holes extending through said solid body and tongue; and
   (D) said first and second end caps are comprised of a solid body having a first side, and second and third sides protruding substantially perpendicularly from the ends of said first side.

2. The corner shelf assembly of claim 1, having a third end cap and a rail fastened through one of the second or third sides of said first, second and third end caps.

3. The corner shelf assembly of claim 1, wherein the first and second walls of a wall corner join at a substantially right angle with respect to one another.

4. The corner shelf assembly of claim 1, wherein the third side of said shelf has linear segments extending from said first and second sides, respectively, at substantially right angles.

5. The corner shelf assembly of claim 1, wherein said corner shelf is made of tempered glass.

6. The corner shelf assembly of claim 1, wherein the corner element, the first and second support rails, and the first and second end caps are made of materials selected from the group consisting of metal, metal alloy, wood and plastic.

7. A corner shelf assembly comprising a shelf secured to a corner element attached to first and second support rails, and first and second end caps fastened to said first and second support rails, wherein
   (A) said shelf is comprised of first and second sides conforming to first and second walls of a wall corer, respectively, a clipped corner at the apex of said first and second sides, and a third side;
   (B) said corner element is comprised of a solid body having first and second sides conforming to said first and second walls of a wall corner, respectively, a horizontal slot to receive the clipped corner of said shelf, a lip and a base, collectively to hold said corner shelf in a horizontal position, third and fourth sides joining said first and second sides, respectively, at substantially right angles, a fifth side joining said third and fourth sides, and first and second bases protruding substantially perpendicularly from said third and fourth sides to support said first and second support rails;
   (C) said first and second support rails are comprised of a solid body having a tongue protruding perpendicularly from said solid body and running the length of said solid body, and a plurality of horizontally placed holes extending through said solid body and tongue; and
   (D) said first and second end caps are comprised of a solid body having a first side, and second and third sides protruding substantially perpendicularly from the ends of said first side.

8. The corner shelf assembly of claim 7, having a third end cap and a rail fastened through one of the second or third sides of said first, second and third end caps.

9. The corner shelf assembly of claim 7, wherein the first and second walls of a wall corner join at a substantially right angle with respect to one another.

10. The corner shelf assembly of claim 7, wherein the third side of said shelf has linear segments extending from said first and second sides, respectively, at substantially right angles.

11. The corner shelf assembly of claim 7, wherein said corner shelf is made of tempered glass.

12. The corner shelf assembly of claim 7, wherein the corner element, the first and second support rails, and the first and second end caps are made of materials selected from the group consisting of metal, metal alloy, wood and plastic.

13. A corner shelf assembly comprising a shelf secured to a corer element attached to first and second support rails, and first and second end caps fastened to said first and second support rails, wherein (A) said shelf is comprised of first and second sides conforming to first and second walls of a wall corner, respectively, a clipped corner at the apex of said first and second sides, and a third side;

(B) said corner element is comprised of a solid body having first and second sides extending substantially perpendicularly with respect to each other and conforming to said first and second walls of a wall corner, respectively, a horizontal slot to receive the clipped corner of said shelf, a lip to hold said corner shelf in a horizontal position, third and fourth sides joining said first and second sides, respectively, at substantially right angles, and a base protruding substantially perpendicularly from said third and fourth sides to hold said corner shelf in a horizontal position collectively with said lip;

(C) said first and second support rails are comprised of a solid body having a tongue protruding perpendicularly from said solid body and running the length of said solid body, and a plurality of horizontally placed holes extending through said solid body and tongue; and (D) said end caps are comprised of a solid body having a first side, and second and third sides protruding substantially perpendicularly from the ends of said first side.

14. The corner shelf assembly of claim 13, having a third end cap and a rail fastened through one of the second or third sides of said first, second and third end caps.

15. The corner shelf assembly of claim 13, wherein the first and second walls of a wall corner join at a substantially right angle with respect to one another.

16. The corner shelf assembly of claim 13, wherein the third side of said shelf has linear segments extending from said first and second sides, respectively, at substantially right angles.

17. The corner shelf assembly of claim 13, wherein said corner shelf is made of tempered glass.

18. The corner shelf assembly of claim 13, wherein the corner element, the first and second support rails, and the first and second end caps are made of materials selected from the group consisting of metal, metal alloy, wood and plastic.

* * * * *